United States Patent [19]

Lia

[11] Patent Number: 4,547,818

[45] Date of Patent: Oct. 15, 1985

[54] CIRCUIT ARRANGEMENT FOR THE RECORDING OF DATA ON A MAGNETIC RECORDING CARRIER

[75] Inventor: Herman Lia, Li, Norway

[73] Assignee: Tandberg Data A/S, Oslo, Norway

[21] Appl. No.: 530,030

[22] Filed: Sep. 7, 1983

[30] Foreign Application Priority Data

Sep. 9, 1982 [DE] Fed. Rep. of Germany ....... 3233489

[51] Int. Cl.$^4$ ................................................ G11B 5/09
[52] U.S. Cl. ..................................................... 360/46
[58] Field of Search .............................. 360/46, 66, 68

[56] References Cited

U.S. PATENT DOCUMENTS

| | | | |
|---|---|---|---|
| 3,952,329 | 4/1976 | Dent, III et al. | 360/46 |
| 4,202,017 | 5/1980 | Getton et al. | 360/66 |
| 4,470,081 | 9/1984 | Chi | 360/66 |

FOREIGN PATENT DOCUMENTS

| | | | |
|---|---|---|---|
| 0030300 | 6/1981 | European Pat. Off. | 360/46 |
| 0030644 | 6/1981 | European Pat. Off. | 360/46 |
| 2936896 | 3/1981 | Fed. Rep. of Germany | 360/46 |

Primary Examiner—Vincent P. Canney
Attorney, Agent, or Firm—Hill, Van Santen, Steadman & Simpson

[57] ABSTRACT

High-frequency magnetic bias signals are superimposed on the data signals and are synchronized with the data signals. For the data signals and for the magnetic bias signals in each instance a separate write amplifier with two logic elements is provided which are alternately switched in dependence upon the binary values of the data signals and the magnetic bias signals, respectively. Mutually corresponding logic elements in the write amplifiers are interconnected at the output side via resistances. The magnetic head is connected between the connection points of the resistances. The resistances determine the respective current through the magnetic head. As logic elements preferably integrated NAND circuits without output-side collector resistances are provided.

9 Claims, 3 Drawing Figures

CIRCUIT ARRANGEMENT FOR THE RECORDING OF DATA ON A MAGNETIC RECORDING CARRIER

BACKGROUND OF THE INVENTION

The invention relates to a circuit arrangement for the recording of data on a magnetic recording carrier wherein synchronized high frequency bias is superimposed on the data signal to be recorded.

In the case of a recording of data on a magnetic recording carrier, for example a magnetic tape or a magnetic disk, it is already generally known to supply data signals representing the data to be recorded, to a write amplifier which generates a write current proportional to the data signals and supplies the latter write current to a magnetic head. For the allocation of the data to the data signals, a plurality of recording modes, for example, the NRZI-recording mode, the MFM-recording mode, or the GCR-recording mode, are available.

From European published patent application No. 0030 644 it is already known, in the case of a recording of data on a magnetic recording carrier, to superimpose on the data signals high-frequency magnetic bias signals. The magnetic bias signals are synchronized with the data signals. Through the utilization of the magnetic bias signals, the amplitude of the data signals can be reduced so that, during the recording operation, crosstalk from recording magnetic heads to reading magnetic heads is reduced. Furthermore, through the magnetic bias signals the recording operation is linearized so that the changes in the data signals, which correspond to the changes of the magnetization on the recording carrier, can be more precisely recognized. This is achieved, in particular, through the synchronization of the magnetic bias signals and the data signals.

It would be conceivable to sum up the data signals and the magnetic bias signals corresponding to their amplitude and to supply the sum signal to a write amplifier. The write amplifier in this case would have to be designed in the form of an analog amplifier and would have to exhibt a comparatively high limit frequency. Furthermore, it would be conceivable to provide for the data signals and for the magnetic bias signals a respective separate write amplifier, designed as a differential amplifier or controlled current source. This would require a comparatively great outlay and also the danger exists that, as a consequence of the high frequency of the magnetic bias signals, phase displacements between the magnetic bias signals and the data signals would occur.

SUMMARY OF THE INVENTION

Accordingly, a principal object underlying the invention resides in providing a circuit arrangement with the aid of which data are recorded, pursuant to utilization of data signals and magnetic bias signals, with low outlay and great precision, on a magnetic recording carrier.

In accordance with the invention, the object is achieved in the case of the circuit arrangement of the initially cited type through the use of write amplifiers for high frequency bias and for the data signal to be recorded which are comprised of pairs of logic elements interconnected at their outputs via respective resistances with the magnetic head.

The circuit arrangement according to the invention has the advantage that it can be very economically constructed since the logic elements in general are substantially more simply constructed than analog amplifiers. Furthermore, the circuit arrangement has the advantage that, through the dimensioning of the resistances, the currents associated with the data signals and the magnetic bias signals can be adjusted in a simple fashion.

As logic elements, in particular, NAND circuits, prove expedient, to the first inputs of which the inverted and the non-inverted data signals, and magnetic bias signals, are respectively supplied, and to whose second inputs an enable signal is supplied. The inverted and the non-inverted signals may, for example, be generated with the utilization of a flip-flop circuit. A particularly low outlay, however, is achieved if the inverted data signals and magnetic bias signals are generated by means of inverters. As logic elements, expediently binary logic elements, designed in the form of integrated circuits, without collector resistances are employed. The collector resistances, in this case, are formed from the resistances with which the logic elements of the respective write amplifiers are connected at the output side.

In case the circuit arrangement is arranged on a printed circuit board and this printed circuit board is intended to be employed for the recording of data with the utilization of magnetic bias signals as well as without such magnetic bias signals, it is advantageous if the logic elements of each write amplifier are arranged in a separate integrated circuit. In case recording is to be carried out without magnetic bias signals, the corresponding integrated circuit and the respective resistances need not be soldered in. Of course, the other resistances must be newly dimensioned corresponding to the write current which is then necessary.

In the following, an exemplary embodiment of the circuit arrangement shall be explained in greater detail on the basis of the accompanying sheets of drawings; and other objects, features and advantages will be apparent from this detailed disclosure and from the appended claims.

DETAILED DESCRIPTION

Figure 1:
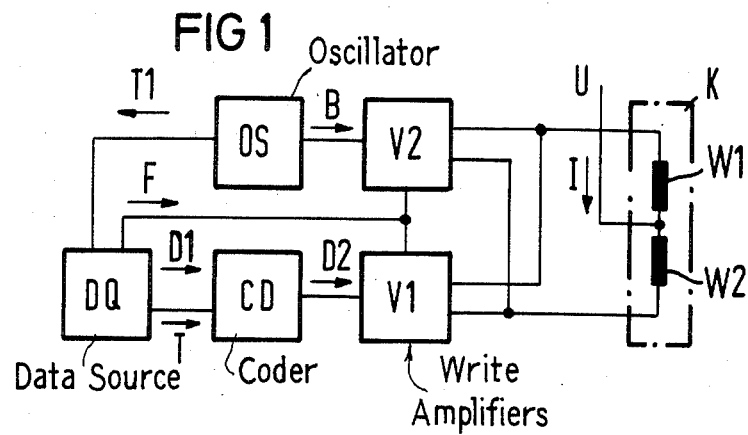
FIG. 1 shows a block circuit diagram of a circuit arrangement for the recording of data on a magnetic recording carrier.

In the block circuit diagram illustrated in FIG. 1, a data source DQ generates data signals D1 for representing the data to be recorded, and respective clock pulses T. The clock pulses T can be generated in a clock pulse generator provided in the data source DQ or they can be obtained from signals T1 which are emitted by an oscillator OS. In addition, the data source DQ generates an enable signal F which is supplied to two write amplifiers V1 and V2. The data signals D1 and the clock pulses T are supplied to a coder CD which, corresponding to the respectively employed write method, emits data signals D2 to the write amplifier V1. The latter generates a write current I, proportional to the data signals D2, for a magnetic head K with two windings W1 and W2. In dependence upon the binary values of the data signals D2, the write current I flows from a center tap either via the winding W1 or the winding W2 to the write amplifier V1.

The oscillator OS generates high-frequency magnetic bias signals B and supplies the latter to the write amplifier V2. The latter likewise generates a write current I which, in turn, in dependence upon the binary values of the magnetic bias signals B, flows from the center tap either via the winding W1 or the winding W2 to the write amplifier V2.

Further details of the circuit arrangement shall be described in the following description taken with the timing diagrams illustrated in FIG. 2.

Figure 2:
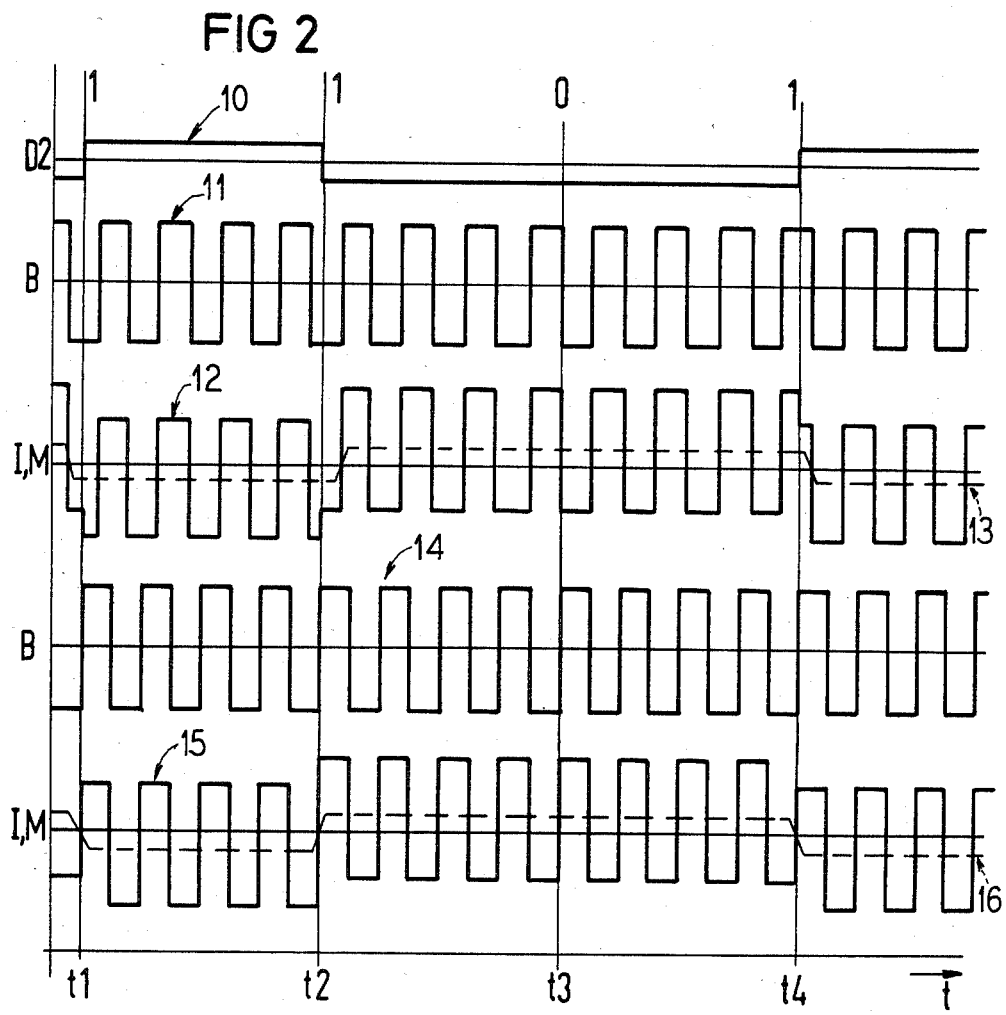
FIG. 2 shows timing diagrams for signals at various points of the circuit arrangement of FIG. 1.

In the case of the timing diagrams illustrated in FIG. 2, it is assumed that a sequence of binary values 1101 is to be recorded on the recording carrier and that the latter binary values are coded corresponding to the NRZI-recording mode. The coder CD emits the data signals D2 which always exhibit a change when the data have the binary value of one.

It is initially assumed that the data signals D2 (as represented by waveform 10, FIG. 2) and the magnetic bias signals B are not synchronized (as is the case for B waveform 11, FIG. 2). In this case, during the superposition of the data signals D2 and the magnetic bias signals B, as is illustrated in FIG. 2 by the resultant I waveform at 12, the zero crossings do not occur at the times t1, t2 and t4, but slightly earlier or later. In a corresponding fashion, the location at which the magnetization M, which is illustrated by broken line 13, changes on the recording carrier also becomes displaced. This displacement, in turn, has as a consequence a displacement of the peaks of the read signals during the read operation, whereby the certainty (or reliability) during the retrieval of the recorded data is reduced.

In the lower part of FIG. 2, for the waveforms 14, 15 and 16, it is assumed that the data signals D2 (waveform 10) and the magnetic bias signals B (waveform 14) are synchronized according to phase and frequency so that the zero crossings of the data signals D2 (waveform 10 of FIG. 2) coincide with zero crossings of the magnetic bias signals (waveform 14, FIG. 2). In the case of the superimposition of synchronized data and bias signals, the progression of the write current I and of the magnetization is shown by waveforms 15 and 16 in the lowermost section of FIG. 2. It can be recognized that the resultant write current I (waveform 15) always changes polarity at the same times t1, t2 and t4, as the data signals D2 (waveform 10). In a corresponding fashion also the magnetization M on the recording carrier (waveform 16) changes polarity at the locations associated with the times t1, t2 and t4.

Figure 3:
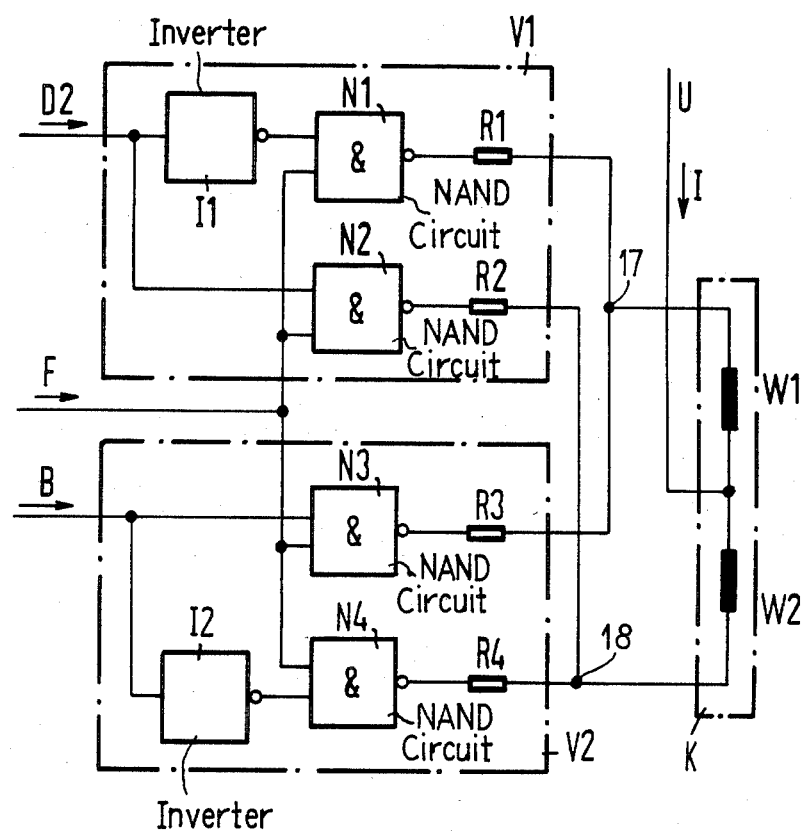
FIG. 3 is a circuit diagram showing write amplifiers for the circuit arrangement of FIG. 1.

The write amplifiers V1 and V2, illustrated in FIG. 3, respectively, contain two logic elements N1 and N2, and N3 and N4, respectively, which are designed in the form of NAND circuits. The outputs of corresponding logic elements N1 and N3, and N2 and N4, respectively, are interconnected via resistances R1 and R3, R2 and R4, respectively, and the windings W1 and W2 of the magnetic head K are connected to the connection points 17 and 18. Connected to the first inputs of the logic elements N1 through N4 are the data signals D2 and the magnetic bias signals B, inverted or non-inverted, respectively, and connected to the second inputs is the enable signal F which enables the write operation. The inverted data signals D2 and the inverted magnetic bias signals B are generated by two inverters I1 and I2, respectively, which are connected with a respective input of the logic elements N1 and N4.

The data signals D2 and the magnetic bias signals B are supplied non-inverted to the logic elements N2 and N3, respectively. Instead of the inverters I1 and I2, also flip-flops can be provided whose inverting and non-inverting outputs are in each instance connected with an input of one of the logic elements. The logic elements N1 through N4 can also be designed as simple inverters if the enablement through the enable signal F is not necessary.

When the data signal D2 and the magnetic bias signal B have the binary value of one and the enabling signal F is present the outputs of the logic elements N2 and N3 assume the binary value of zero, and a write current I flows via the winding W1 and the resistance R3 to the logic element N3, on the one hand, and, via the winding W2 and the resistance R2, to the logic element N2, on the other hand. The alternate flow paths are active when the data signal D2 and the magnetic bias signal B have the binary value of zero. In this case, the logic elements N1 and N4 assume the binary value of zero, so that the write current I flows via the winding W1 and the resistance R1, on the one hand, and via the winding W2 and the resistance R4, on the other hand.

When the data signal D2 has the binary value of one and the magnetic bias signal has the binary value of zero, the logic elements N2 and N4 assume at the output the binary value zero, so that the write current I in the winding W2 flows via the resistance R2 to the logic element N2, on the one hand, and, via the resistance R4 to the logic element N4, on the other hand. The corresponding applies for winding W1 when the data signal D2 has the binary value of zero and the magnetic bias signal B has the binary value of one. In this case, the write current I flows via the winding W1 and the resistances R1 and R3 to the NAND circuits N1 and N3.

Through the resistances R1 through R4 the amplitude of the write current I is adjusted. The write current, which is associated with the magnetic bias signal B, is, for example, so adjusted that it exhibits quadruple the amplitude of the write current which is associated with the data signal D2. When the data signals D2 and the magnetic bias signals B exhibit the same binary values, the write current I results from the difference between the two partial write currents, and when they exhibit different binary values the write current I results from the sum of the two partial write currents, so that the write current I receives the progression illustrated by waveform 15 at the lowermost section of FIG. 2.

The logic elements N1 through N4 are preferably designed in the form of logic elements (or logic gates) whose output stages do not exhibit any collector resistances. Serving as collector resistances in this case are the resistance R1 through R4. Logic elements of this type are generally known and obtainable, for example, under the designation SN7438 from the Texas Instruments Company. Expediently the logic elements N1 through N4 are so subdivided that the logic elements N1 and N2 are component parts of one integrated circuit chip and the logic elements N3 and N4 are component parts of a second integrated circuit chip. What is achieved thereby is that the circuit arrangement, in case it is constructed on a printed circuit board, can be very simply employed also for the recording of data without magnetic bias signals B in that the integrated circuit with the logic elements N3 and N4 and the resistances R3 and R4 is not soldered in. Of course, the resistances R1 and R2 must then be newly dimensioned.

It will be apparent that many modifications and variations may be made without departing from the scope of the teachings and concepts of the present invention.

I claim as my invention:

1. A circuit arrangement for the recording of data on a magnetic recording carrier, including a magnetic head with a center tap, a first write amplifier and a second write amplifier connected to the magnetic head, wherein the first write amplifier supplies data signals representing the data to be recorded and the second write amplifier supplies high-frequency magnetic bias signals to the magnetic head, and wherein the data signals and the magnetic bias signals are synchronized with one another, characterized in that the first write amplifier and the second write amplifier each comprise two binary logic elements which alternately switch, in dependence upon the binary values of the data signals and magnetic bias signals, respectively, with resistances connected with the outputs of the binary logic elements, respective logic elements of the write amplifiers being interconnected in pairs via the resistances to define connection points between the connected resistances, said connection points being connected to the magnetic head and the center tap of head having means for connection to an operating voltage.

2. A circuit arrangement according to claim 1, characterized in that the logic elements are designed in the form of integrated circuits without output-side collector resistances, and that the resistances are provided as collector resistances.

3. A circuit arrangement according to claim 1, characterized in that, as logic elements, NAND circuits are provided, to the first inputs of which the non-inverted and the inverted data signals and magnetic bias signals are connected, and to the second inputs of which an enabling signal is connected.

4. A circuit arrangement according to claim 1, characterized in that the write amplifiers include inverters which invert the data signal and the magnetic bias signal, respectively, for supply in each instance to one of the logic elements.

5. A circuit arrangement according to claim 1, characterized in that the resistances are provided in the form of summation resistances as well as for the adjustment of the write current in the magnetic head.

6. A circuit arrangement according to claim 1, characterized in that the logic elements are designed in the form of integrated circuits, and that, for each write amplifier a separate integrated circuit unit is provided.

7. A circuit arrangement according to claim 1, with the magnetic head having first and second winding means between the respective connection points and the center tap, and logic means comprising said binary logic elements selectively establishing the following current flow conditions during operation of the head:
   (1) a data current of a magnitude determined by a first of said resistances flowing through the first winding means of the head; and a bias current of a magnitude determined by a third of said resistances flowing through the first winding means of the head;
   (2) a data current of a magnitude determined by the second of said resistances flowing through the second winding means; and a bias current of a magnitude determined by a fourth of said resistances flowing through the second winding means;
   (3) a data current of a magnitude determined by the first of said resistances flowing through the first winding means; and a bias current of a magnitude determined by the fourth of said resistances flowing through the second winding means; and
   (4) a data current of a magnitude determined by said second of said resistances flowing through the second winding means; and a bias current of a magnitude determined by the third of said resistances flowing through the first winding means.

8. A circuit arrangement according to claim 7, with said logic means comprising said two binary logic elements of each of the write amplifiers providing inputs for receiving successive signal patterns according to the state of the synchronized data and magnetic bias signals and logically processing said signal patterns such that the data and magnetic bias signals and their complements control the first and second write amplifiers in accordance with respective NAND functions to establish a respective one of the current flow conditions for each respective signal pattern of said data and magnetic bias signals.

9. A circuit arrangement according to claim 8, with said logic means having a further input for receiving a common enable signal for simultaneously enabling each of the NAND functions for the processing of each successive signal pattern of said data and magnetic bias signals.

* * * * *